No. 884,080. PATENTED APR. 7, 1908.
G. T. FALLIS.
WAVE MOTOR.
APPLICATION FILED APR. 16, 1907.

2 SHEETS—SHEET 1.

No. 884,080. PATENTED APR. 7, 1908.
G. T. FALLIS.
WAVE MOTOR.
APPLICATION FILED APR. 16, 1907.

2 SHEETS—SHEET 2.

Witnesses:

Inventor:
George T. Fallis,
By Attorneys

UNITED STATES PATENT OFFICE.

GEORGE T. FALLIS, OF LOS ANGELES, CALIFORNIA.

WAVE-MOTOR.

No. 884,080.     Specification of Letters Patent.     Patented April 7, 1908.

Application filed April 16, 1907. Serial No. 368,508.

*To all whom it may concern:*

Be it known that I, GEORGE T. FALLIS, a citizen of the United States, residing at Los Angeles, in the county of Los Angeles and State of California, have invented new and useful Improvements in Wave-Motors, of which the following is a specification.

My invention relates to ways and means for securing direct power, with continuous, regular and augmentable rotary motion from the force of the waves. I accomplish this result by means of the device described herein and illustrated in the accompanying drawings, in which:—

Figure 1:
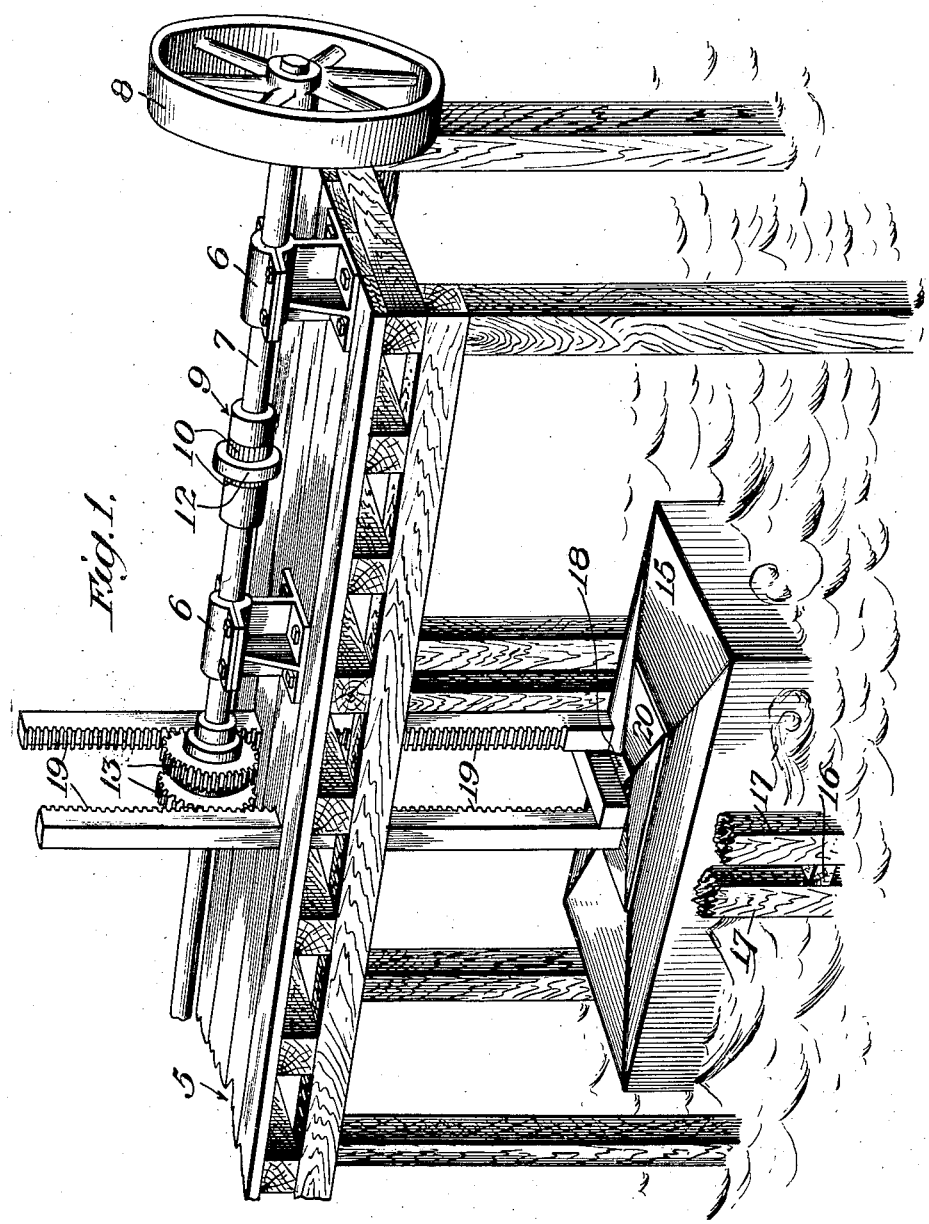
Figure 2:
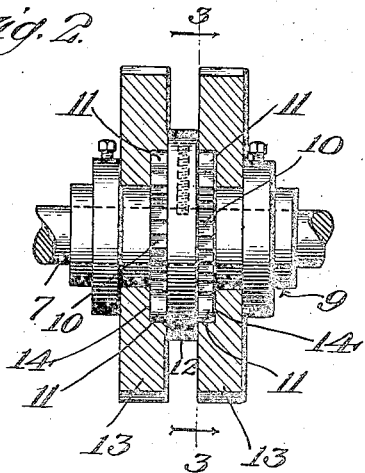
Figure 3:
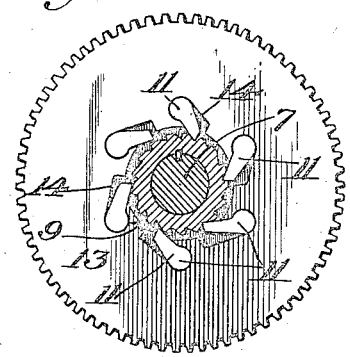
Figure 4:
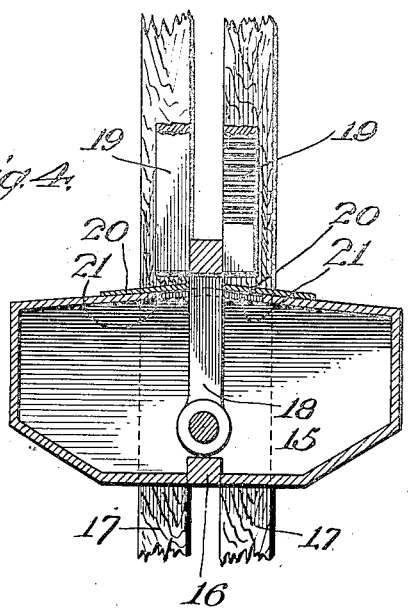

Figure 1— is a perspective view of my complete wave motor. Fig. 2—is a detail elevation of the driving gears which are mounted on the main shaft. Fig. 3— is a vertical section on line 3—3 of Fig. 2. Fig. 4— is a vertical section of a float and its retaining piles.

On a suitably constructed pier 5 extending into the ocean approximately at right angles to the shore, is laid in journals 6 of suitable form a horizontal revolving shaft 7 extending longitudinally with the pier and having mounted on the shore end a balance wheel 8 adapted to carry a belt for conveying power to other machinery (not shown). This shaft may be in sections of convenient length joined by detachable or other suitable connections and extending to any desired length. On this shaft at suitable intervals are keyed a number of cores or hubs 9 having on their convex surfaces longitudinal angular grooves 10 (Figs. 2 and 3) adapted to the reception of pawls or clutches 11 as hereinafter described. On each of these cores or hubs as an axle, the middle being belted by a collar or flange 12 to separate them, are made to revolve two corresponding reciprocating wheels 13 of suitable size having cogs on their external rims, and having on their inner circle cavities 14 which loosely carry pawls or clutches 11 designed to drop into the grooves of the core in such way that when the wheels 13 are revolved in one direction the shaft will be forced to turn also, but when turned the other way the pawls will pass without clutching. Beneath each of these sets of gearing is launched on the surface of the ocean a vessel or float 15 suitably stayed by a transverse horizontal beam 16 through the middle near the bottom having ends projecting and each entering between two parallel perpendicular piles 17 which guide it vertically and prevent any lateral motion. To the center of the float, is pivotally secured a substantial spar or pitman 18 extending upward to the top of the float and there forking so that one part passes on either side of the shaft and wheel gearing, each carrying a perpendicular cogged bar 19 of suitable length, with faces sufficiently ajog to work respectively in the corresponding wheels of the gearing, so that when the float is rising one wheel will clutch and turn the shaft, and when sinking that wheel will release and the other will clutch and continue the movement of the shaft in the same direction, thus producing continuous rotary motion, which may be augmented and regulated by the addition to the same shaft of any desired number of floats and gearing as already described. These sets of wheel gearing are so constructed as not to conflict in the least with each other though there be many on the same shaft, but all work in harmony and contribute each its volume of force to the main shaft, thus producing immense power. Now it is evident that the power thus obtained depends on the size and number of the floats and on the height and frequency of the waves. The larger the size and number of floats, the greater will be the energy and the better the regularity of the movement. Pitman 18 passes through slot 21 in the top of the float and the float is thereby permitted to have a slight oscillation as it rides on the waves. A cover plate 20 fits snugly around the pitman and is adapted to slide on the top of the float thus keeping the same water tight.

Having described my invention what I claim as new and desire to secure by Letters Patent is:—

1. A wave motor having in combination with a main revolving shaft extending horizontally with the pier, cores keyed at intervals thereon, each core being the axis for two reciprocating cogged wheels, carrying pawls to engage the grooves therein and having in connection therewith two corresponding perpendicular cogged bars, one working in each wheel and on opposite sides of the shaft being joined at the lower ends by a pitman hinged to a float, all as substantially shown and described.

2. In a wave motor the combination with a main revolving shaft extending with the pier on which it is journaled, and having keyed thereto cores with pairs of reciprocating geared clutch wheels journaled thereon and operated by perpendicular rack bars connected to a pitman hinged to a float, a float having a central horizontal transverse beam with projections beyond the sides of the float, adapted to glide between perpendicular guides, which prevent its lateral and guide its vertical movement.

In witness that I claim the foregoing I have hereunto subscribed my name this 9th day of April, 1907.

GEORGE T. FALLIS.

Witnesses:
EDMUND A. STRAUSE,
TRIMBLE BARKELEW.